United States Patent
Lei et al.

(10) Patent No.: US 10,327,010 B2
(45) Date of Patent: Jun. 18, 2019

(54) IN-LOOP FIDELITY ENHANCEMENT FOR VIDEO COMPRESSION

(71) Applicant: MEDIATEK INC., Hsin-Chu (TW)

(72) Inventors: Shaw-Min Lei, Hsinchu County (TW); Yu-Wen Huang, Taipei (TW); Xun Guo, Beijing (CN)

(73) Assignee: HFI Innovation Inc., Hsinchu County (TW)

( * ) Notice: Subject to any disclaimer, the term of this patent is extended or adjusted under 35 U.S.C. 154(b) by 284 days.

(21) Appl. No.: 14/614,422

(22) Filed: Feb. 5, 2015

(65) Prior Publication Data
US 2015/0146782 A1    May 28, 2015

Related U.S. Application Data

(63) Continuation of application No. 12/203,933, filed on Sep. 4, 2008, now abandoned.
(Continued)

(51) Int. Cl.
*H04N 11/02* (2006.01)
*H04N 19/82* (2014.01)
(Continued)

(52) U.S. Cl.
CPC .......... *H04N 19/82* (2014.11); *H04N 19/46* (2014.11); *H04N 19/61* (2014.11); *H04N 19/86* (2014.11);
(Continued)

(58) Field of Classification Search
CPC ........ H04N 19/46; H04N 19/96; H04N 19/61; H04N 19/86; H04N 19/91; H04N 19/82; H04N 19/865
(Continued)

(56) References Cited

U.S. PATENT DOCUMENTS

| 4,922,341 A | 5/1990 | Strobach |
| 5,550,935 A | 8/1996 | Erdem |

(Continued)

FOREIGN PATENT DOCUMENTS

| CN | 1981535 A | 6/2007 |
| EP | 1 841 230 A1 | 10/2007 |

(Continued)

OTHER PUBLICATIONS

Steffen Wittmann et al., SEI message on post-filter hints for high fidelity, Joint Video Team (JVT) of ISO/IEC MPEG & ITU-T VCEG (ISO/IEC JTC1/SC29/WG11 and ITU-T SG16 Q.6) 20th Meeting, Jul. 17-20, 2006, pp. 1-12, Document: JVT-T039r1, Filename: JVT-T039r1.doc, XP030006526, Klagenfurt, Austria.

(Continued)

*Primary Examiner* — Jayanti K Patel
*Assistant Examiner* — Richard B Carter
(74) *Attorney, Agent, or Firm* — Winston Hsu

(57) ABSTRACT

An encoder for receiving a video frame and performing encoding processes to generate an encoded bitstream includes: a fidelity enhancement block, for performing a fidelity enhancement technique on processed data utilizing a partition method, and generating fidelity enhancement information comprising at least one parameter associated with a partition structure, wherein the fidelity enhancement technique comprises applying discrepancy modeling based on DC offset; and an entropy coding block, coupled to the fidelity enhancement block, for encoding the fidelity enhancement information, and embedding the encoded fidelity enhancement information into the encoded bitstream.

8 Claims, 9 Drawing Sheets

Related U.S. Application Data

(60) Provisional application No. 61/054,820, filed on May 21, 2008, provisional application No. 61/013,305, filed on Dec. 13, 2007.

(51) Int. Cl.
*H04N 19/46* (2014.01)
*H04N 19/96* (2014.01)
*H04N 19/86* (2014.01)
*H04N 19/61* (2014.01)
*H04N 19/91* (2014.01)

(52) U.S. Cl.
CPC ........... *H04N 19/865* (2014.11); *H04N 19/91* (2014.11); *H04N 19/96* (2014.11)

(58) Field of Classification Search
USPC ................ 375/240.12, 240.24; 382/236, 240
See application file for complete search history.

(56) References Cited

U.S. PATENT DOCUMENTS

| | | | |
|---|---|---|---|
| 6,125,147 A | 9/2000 | Florencio | |
| 2004/0258162 A1* | 12/2004 | Gordon | H04N 19/91 375/240.25 |
| 2005/0111741 A1* | 5/2005 | Kim | H04N 19/50 382/232 |
| 2005/0195896 A1* | 9/2005 | Huang | H04N 19/61 375/240.03 |
| 2005/0281334 A1 | 12/2005 | Walker | |
| 2006/0133489 A1* | 6/2006 | Watanabe | H04N 19/105 375/240.12 |
| 2006/0165301 A1* | 7/2006 | Cha | H04N 19/105 382/240 |
| 2006/0251330 A1* | 11/2006 | Toth | H04N 19/52 382/236 |
| 2006/0285590 A1* | 12/2006 | Guleryuz | H04N 19/105 375/240.12 |
| 2007/0091997 A1 | 4/2007 | Fogg | |
| 2007/0268969 A1* | 11/2007 | Kim | H04N 19/00 375/240.24 |
| 2007/0268970 A1 | 11/2007 | Kim | |
| 2008/0008239 A1* | 1/2008 | Song | H04N 19/105 375/240.12 |
| 2008/0317126 A1* | 12/2008 | Yu | H04N 19/176 375/240.12 |
| 2009/0002379 A1* | 1/2009 | Baeza | G06T 1/20 345/522 |
| 2009/0041120 A1* | 2/2009 | Yu | H04N 19/50 375/240.12 |
| 2009/0154567 A1* | 6/2009 | Lei | H04N 19/46 375/240.24 |
| 2010/0135387 A1 | 6/2010 | Divorra Escoda | |

FOREIGN PATENT DOCUMENTS

| | | |
|---|---|---|
| EP | 2 001 239 A2 | 12/2008 |
| GB | 2295742 | 6/1996 |
| JP | H03145392 A | 6/1991 |
| JP | H11164305 A | 6/1999 |
| JP | 2004112825 A | 4/2004 |
| JP | 2006310941 A | 11/2006 |
| JP | 200774750 A | 3/2007 |
| KR | 100287214 B1 | 4/2001 |
| KR | 20030076869 | 9/2003 |
| KR | 1020050031653 | 4/2005 |
| WO | 2005034517 A1 | 4/2005 |
| WO | 2007081176 A1 | 7/2007 |
| WO | 2007111292 A1 | 10/2007 |

OTHER PUBLICATIONS

ICIP2007 "Transmission of post-filter hints for video coding schemes", Steffen Wittmann and Thomas Wedi, in Proceedings of 2007 IEEE International Conference on Image Processing.
Teruhiko Suzuki, Study of professional extension of Intra coding in AVC | H.264, The Institute of Electronics. Information and Communication Engineers, Feb. 2005, vol. 104, No. 649, p. 89-94.

* cited by examiner

IN-LOOP FIDELITY ENHANCEMENT FOR VIDEO COMPRESSION

CROSS REFERENCE TO RELATED APPLICATIONS

The present invention is a continuation application of U.S. patent application Ser. No. 12/203,933, filed on Sep. 4, 2008, which claims the benefit of provisional application 61/013,305 filed on Dec. 13, 2007 and provisional application 61/054,820 filed on May 21, 2008, the contents of which are included herein by reference. Applications cited in the parent case are also included herein as reference.

BACKGROUND

Next generation video coding methods aim to achieve maximum efficiency by compressing data as much as possible. If data can be significantly compressed then high quality video can be streamed and delivered over bandwidth limited networks. The H.264/AVC coding standard is one example of a video coding standard. The H.264 standard combines block motion compensation with transform coding. Transform coding removes spatial redundancy within a frame, whereas block motion compensation removes redundancy between frames.

Video coding is performed in four parts: prediction, transformation, quantization and entropy coding. At the encoding side, prediction can consist of intra prediction, which refers to pixels in the same frame, and inter prediction, which refers to pixels in a preceding frame. Transformation changes prediction residues into coefficients in order to compact the energy of residues toward low frequency bands. Quantization divides transform coefficients of a frame by a value with rounding to a representation of a smaller number of bit-depth in order to further reduce the number of bits a frame can be represented by. The final stage, entropy coding, involves lossless representation of quantized transform coefficients and other parameters. The decoding side performs the inverse of these operations to generate reconstructed pixels. Both decoding and encoding processes include a closed loop wherein encoded/decoded macroblocks of a frame are reconstructed and then input back to a prediction unit for generating coding information of a next frame. Utilizing the reconstructed frame rather than the original frame for predicting the following frames prevents drift between frames.

The H.264 standard utilizes both intra prediction and inter prediction, and performs block based coding. Dividing a frame into macroblocks and separately coding each macroblock can give rise to artifacts created at block edges; i.e. there are visible divisions between blocks as the coding modes or motion vectors of neighboring blocks are usually different. To cancel out these artifacts, most block-based coding techniques include a deblocking filter in the closed coding loop. This deblocking filter can alleviate the artifacts at block edges, but cannot remove quantization errors within blocks. When coding is performed utilizing large quantization values at high fidelity, the deblocking filter alone is not sufficient.

A Wiener filter works by removing noise components from a coded signal in order to bring the noisy coded signal closer to the original signal. When a signal s is input to a typical system, it will be disturbed to some degree resulting in a signal s' that differs from the original signal s. This is the result of additive noise. The purpose of the Wiener filter is to minimize the mean square error between these two signals so that the resultant filtered signal ŝ is closer to the original signal s than to the disturbed signal s'. The Wiener filter operates by generating cross correlation matrices utilizing filter coefficients and auto-correlation matrices.

European Patent No. EP 1 841 230 A1 teaches a Wiener filter implemented both at the encoder and at the decoder side. The Wiener filter is therefore able to first generate the cross-correlation matrix, encoder parameters associated with the matrix, and embed these parameters in the bitstream and send them to the decoder for decoding, where they can be utilized to reduce quantization errors in a decoded frame, ensuring higher fidelity.

SUMMARY

The present invention aims to improve on the system provided in the above-mentioned European Patent Application, by introducing a plurality of fidelity enhancement methods and apparatus, implemented both at the encoder and at the decoder side.

A first encoder for receiving a video frame and performing encoding processes to generate an encoded bitstream comprises: a fidelity enhancement block, for performing a fidelity enhancement technique on processed data utilizing a partition method, and generating fidelity enhancement information comprising at least one parameter associated with a partition structure, wherein the fidelity enhancement technique comprises applying discrepancy modeling based on DC offset; and an entropy coding block, coupled to the fidelity enhancement block, for encoding the fidelity enhancement information, and embedding the encoded fidelity enhancement information into the encoded bitstream.

A first decoder for receiving a bitstream to generate a video frame, comprising: an entropy decoding unit, for decoding the bitstream to generate residues and fidelity enhancement information, wherein the fidelity enhancement information comprises at least one parameter associated with a partition structure; a motion compensation block, for performing motion compensation to generate predictors; and a reconstruction loop, coupled between the entropy decoding unit and the motion compensation block, for reconstructing the video frame from the residues and the predictors. Wherein the reconstruction loop at least comprises: a fidelity enhancement block, for receiving the fidelity enhancement information from the entropy decoding unit, and performing fidelity enhancement technique on the reconstructed video frame according to the partition structure derived from the fidelity enhancement information, wherein the fidelity enhancement technique comprises applying discrepancy modeling based on DC offset.

A second encoder for receiving a video frame and performing encoding processes to generate an encoded bitstream, the encoder comprising: a prediction block, for performing prediction on the video frame to generate prediction residues and prediction information; a transform and quantization block, coupled to the prediction block, for performing transform and quantization processes on the prediction residues; a reconstruction loop, coupled between the transform and quantization block and the prediction block, for reconstructing the video frame according to information from the transform and quantization block; and an entropy coding block, for encoding the prediction residues with the discrepancy modeling information into the encoded bitstream; wherein the reconstruction loop comprises: a reference frame buffer; and a discrepancy modeling block, for performing a discrepancy modeling technique on processed data, and generating discrepancy modeling information, wherein the discrepancy modeling technique is performed to reduce quantization errors between the processed data and original data of the video frame.

A second decoder for receiving a bitstream to generate a video frame, comprising: an entropy decoding unit, for decoding the bitstream to generate residues and discrepancy modeling information; and a reconstruction loop, coupled to the entropy decoding unit, for reconstructing the video frame from the residues; wherein the reconstruction loop comprises: a discrepancy modeling block, for receiving the discrepancy modeling information from the entropy decoding unit, and applying a discrepancy modeling technique on processed data according to the discrepancy modeling information; wherein the discrepancy modeling technique is performed to reduce quantization errors between the processed data and original data of the video frame.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
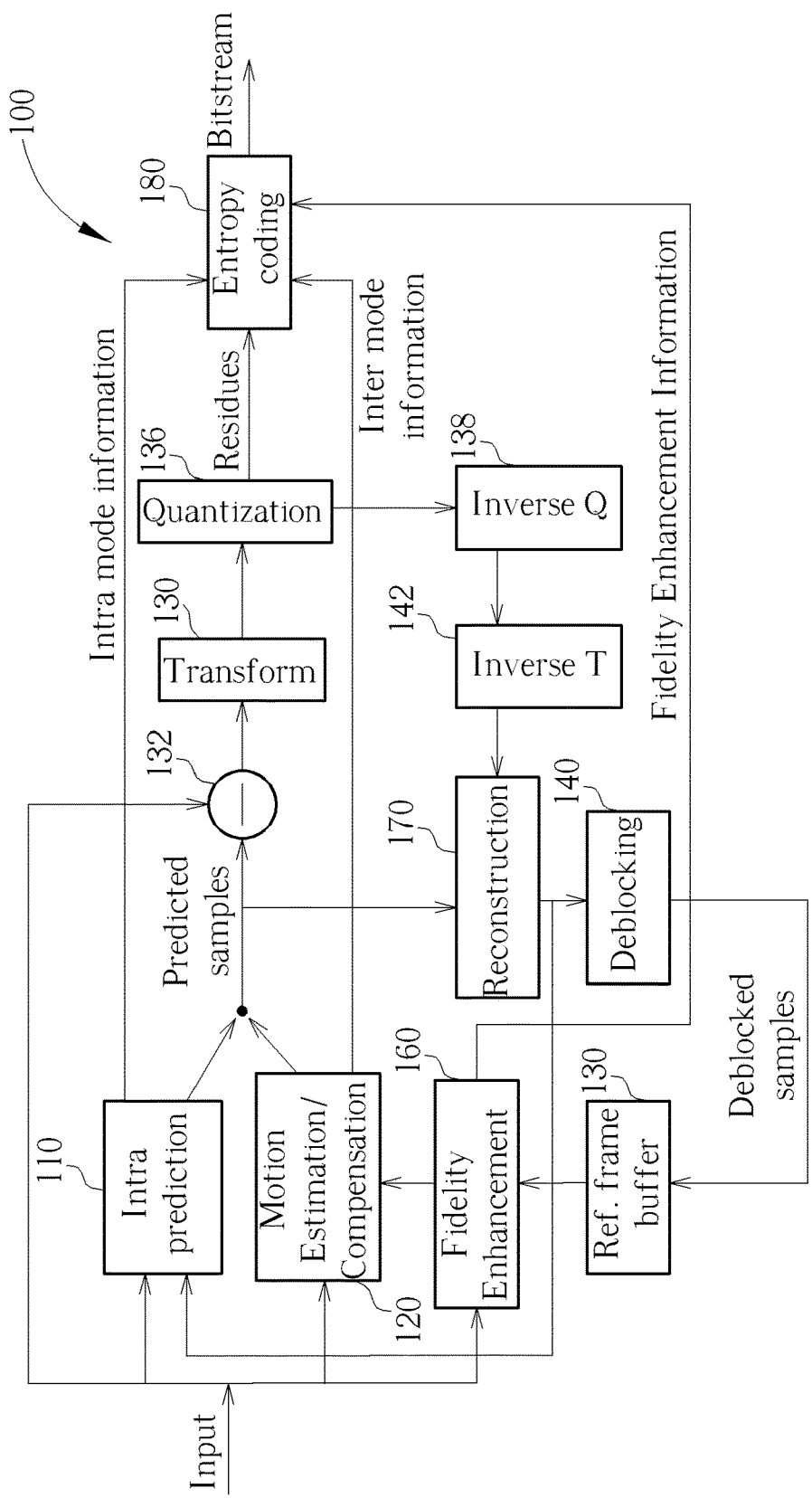
FIG. 1 is a diagram of an encoder according to a first embodiment of the present invention.

The present invention aims to expand on the Wiener filtering in the encoder, by providing a plurality of fidelity enhancement methods, wherein information relating to these fidelity enhancement methods will be encoded and embedded in the bitstream. In this way, when the decoder decodes the received bitstream, the embedded fidelity enhancement information is retrieved and utilized at the decoder side to perform fidelity enhancement on the processed data. This not only enables reduction of quantization errors, but also ensures increased overall quality of the restored video frame, as many different techniques can be carried out on the processed data and many different placements of the fidelity enhancement block at both the encoder and decoder side ensures parity of enhancement.

The purpose of applying fidelity enhancement methods to the video encoders and decoders is to enhance fidelity by canceling errors; examples of the fidelity enhancement method include, but are not limited to, Kalman filtering, noise reduction, deblurring, Wiener filtering, regression, regularization, and various discrepancy modeling such as DC offset (zero order), weighted prediction (first order, e.g. $ax+b$), spatial prediction, for example, higher order prediction (e.g. $av^2+bv+c$), line fitting ($ax+b$, $ay+b$), curve fitting ($av^2+bv+c$, $ay^2+by+c$), plane fitting ($ax+by+c$), and surface fitting ($ax^2+bxy+cy^2+dx+ey+f$).

It should be noted that these fidelity enhancement techniques can be performed on the processed data at a number of stages in the encoder. The following disclosure provides four exemplary embodiments, but the scope of the present invention should not be limited to these four embodiments. Furthermore, modifications wherein more than one fidelity enhancement block is located in the encoder (and at corresponding locations in the decoder) also fall within the scope of the present invention.

As well as providing a plurality of fidelity enhancement methods to be utilized in the encoder, the present invention further provides a plurality of ways of performing said fidelity enhancement techniques, as well as a new bitstream syntax.

It is common to perform Wiener filtering at a slice and block level. The present invention, however, performs fidelity enhancement utilizing a quad-tree partition method on the processed data. By dividing a video frame utilizing quad-tree partition, fidelity enhancement can be performed in such a way as to minimize the cost function. In some frames, for example, a minimum of quantization errors are present in one half of the frame, and therefore less extensive calculations are required. In the other half of the frame, conversely, a large number of quantization errors are present, and therefore more extensive calculations are required to minimize the quantization errors. In such a case, it makes sense to divide the half of the frame with more quantization errors into smaller areas than the other half of the frame. Quad-tree partition therefore provides an adaptive fidelity enhancement method by utilizing cost function analysis to determine the best way to partition the frame.

Figure 9:
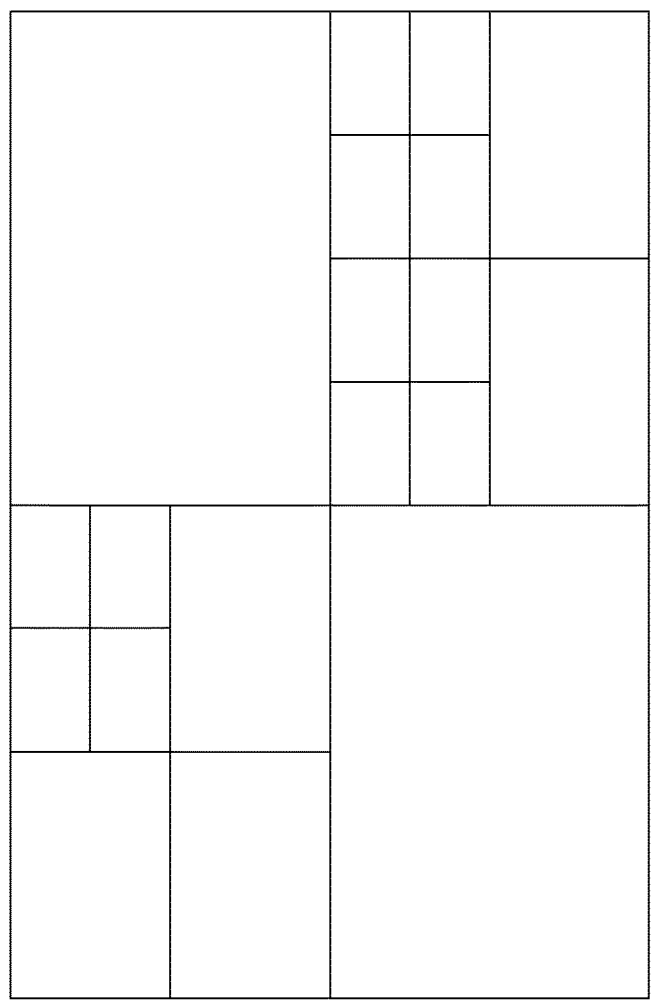
FIG. 9 is a diagram illustrating multi-level quad-tree partition.

FIG. 9 shows an example of a video frame 900 with quad-tree partition. Processed data of the video frame 900 are provided to a fidelity enhancement block, for example, a Wiener filter, and the fidelity enhancement block first determines a quad-tree partition structure based on cost function comparison. The fidelity enhancement block may employ a top-down splitting algorithm, bottom-up merging algorithm, or any kind of order, to sequentially calculate a cost function corresponding to each candidate quad-tree partition structure, in order to determine the quad-tree partition structure with a minimum cost. An example of the cost function is the rate distortion function ($J=D+\lambda r$). For the top-down splitting algorithm, the video frame 900 is first divided into four first-level parts, a cost function corresponding to an un-divided frame and a cost function corresponding to the four first-level parts (the divided frame) are compared, and the partition obeys the one with the smaller cost function. If the latter cost function is smaller, each of the first-level parts is further divided into four second-level parts, and cost functions corresponding to the un-divided and divided first-level part are compared to determine whether this first-level part needs to be split. The video frame 900 in FIG. 9 shows two first-level parts, at the bottom left and top right of the frame, which are not further divided into second-level parts, however, the other two first-level parts are further divided. Similarly, each of the second-level part is divided into third-level parts and cost functions are compared, and this top-down splitting algorithm terminates when a predetermined partition level is approached.

For the bottom-up merging algorithm, the fidelity enhancement block starts calculating cost functions of smallest parts, for example, for third-level parts, a cost function corresponding to four third-level parts is compared with a cost function corresponding to a larger area composed of these four third-level parts. The four third-level parts are merged into a second-level part if the latter cost function is lower. Four second-level parts can also merged into a first-level part after cost function comparison. The quad-tree partition structure finally determined by the fidelity enhancement block can be one of the fidelity enhancement information that will be embedded in the bitstream at the entropy coding stage.

When performing fidelity enhancement with quad-tree partition, each calculation result for a smaller region can be fully reused by a larger region containing the smaller one. Such a reuse method can be applied to both the bottom-up merging and top-down splitting algorithms. Calculation results corresponding to smaller regions can be computed first, and these calculation results can then be reused for calculation of the larger region. In an embodiment of utilizing Wiener filter for fidelity enhancement, filter parameters including cross-correlation and auto-correlation matrices are generated. When certain partition methods, such as quad-tree partition methods, are performed, certain areas of a filtered frame will be re-filtered, depending on the size of the area. The present invention, therefore, provides a reuse method for this Wiener filtering wherein cross-correlation and auto-correlation matrices for a smaller area are reused for a larger area, when filtering is performed on the larger area composed of the smaller area. This saves on calculation time.

Fidelity enhancement parameters are usually encoded and embedded in the tail of the encoded bitstream. As providing fidelity enhancement parameters in the tail of the bitstream means that the decoder cannot start performing fidelity enhancement until the tail of the bitstream is decoded, some conventional methods place fidelity enhancement information in the header. This method, however, requires re-catenation of the bitstream. The present invention, therefore, still embeds fidelity enhancement information in the tail of the bitstream, but places a pointer in the header to indicate the location of the fidelity enhancement information in the bitstream. For example, the pointer can give information concerning the number of bits between the header and the tail. This allows the decoder to search for the fidelity enhancement information as soon as the pointer (in the header) is decoded, and the decoder can therefore start performing fidelity enhancement much faster than if the decoder had to decode the whole bitstream before obtaining the fidelity enhancement parameters. Please note that the fidelity enhancement parameters do not necessarily have to be embedded in the tail of the bitstream and the pointer can refer to any information that is stored at any point in the bitstream, as the pointer is modified by the encoder, and is therefore an adaptive pointer.

At least one or all of these methods can be utilized by the fidelity enhancement block detailed above. The following diagrams will illustrate various locations of the fidelity enhancement block, and further explain the operation of the fidelity enhancement block.

Please refer to FIG. 1. FIG. 1 is a diagram of an encoder 100 comprising a fidelity enhancement (FE) block 160. The encoder 100 comprises an intra prediction block 110, an inter (ME/MC) prediction block 120, a subtractor 132, a transform block 134, a quantization block 136, an inverse transform block 142, an inverse quantization block 138, a reconstruction unit 170, a deblocking unit 140, a reference frame buffer 130 and an entropy coding unit 180. Apart from the fidelity enhancement block 160, the other components of the encoder 100 are well-known to those skilled in the art, and therefore the function and operation of these components will not be detailed here. The fidelity enhancement block 160 receives processed data of one or more reference frames from the reference frame buffer 130, reduces discrepancy between the processed data of the reference frame and data of a current frame, and provides compensated processed data to the inter (ME/MC) prediction block for prediction. The fidelity enhancement block 160 can perform at least one of the above-listed fidelity enhancement methods, at block, slice or quad-tree level. The fidelity enhancement block 160 can also utilize one or more of the above-listed methods when performing fidelity enhancement and generating FE associated parameters. In other words, the FE block 160 as disclosed in FIG. 1 can reuse auto-correlation and cross-correlation matrices when performing Wiener filtering, and the generated FE information can be embedded into the tail of the encoded bitstream while utilizing the adaptive pointer in the header of the encoded bitstream to notify the decoder of the location of the fidelity enhancement information in the bitstream.

Figure 2:
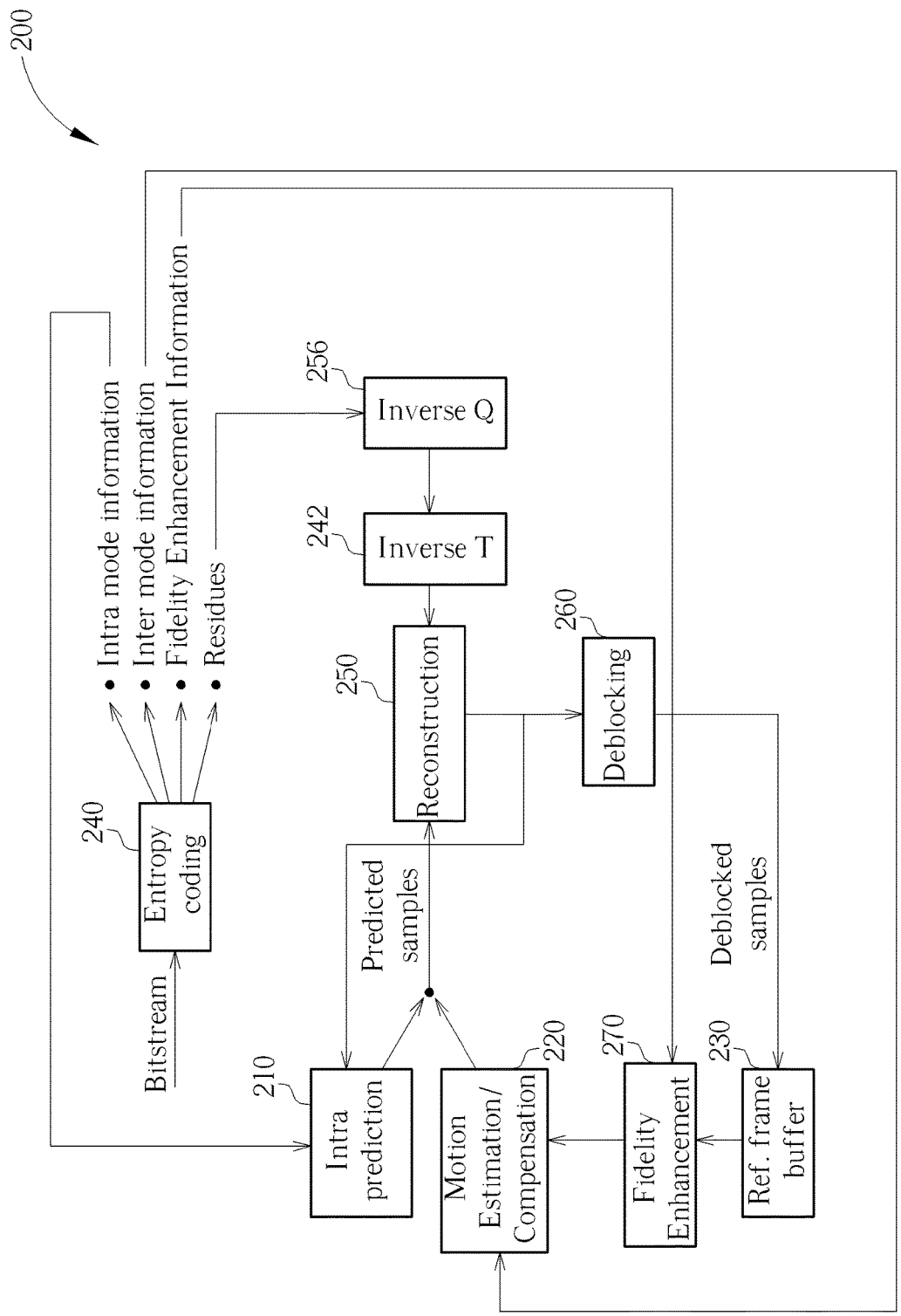
FIG. 2 is a diagram of a decoder according to the first embodiment of the present invention.

Please refer to FIG. 2. FIG. 2 is a diagram of a decoder 200 according to the first embodiment of the present invention. The decoder 200 also includes a fidelity enhancement block 270 in a corresponding location to the FE block 160 in the encoder 100. This ensures that fidelity enhancement information generated by the encoder 100 can be optimally utilized by the decoder 200. The decoder 200 further comprises an entropy decoding unit 240, an intra prediction block 210, a motion compensation (MC) unit 220, a reference frame buffer 230, an inverse quantization block 256, an inverse transform block 242, a reconstruction unit 250 and a deblocking unit 260. As the function and operation of these units is well known to those skilled in the art, related details are not included here for brevity. The entropy decoding unit 240 retrieves residues and information such as fidelity enhancement information from a received bitstream. In some embodiments, the entropy decoding unit 240 obtains a pointer indicating the location of the fidelity enhancement information in the received bitstream while decoding a header. The fidelity enhancement block 270 then receives the fidelity enhancement information from the entropy decoding unit 240 and conducts fidelity enhancement on processed data of one or more reference frames stored in the reference frame buffer. In some embodiments, the fidelity enhancement information comprises information representing a specific quad-tree partition structure, and the fidelity enhancement block performs filtering or discrepancy modeling according to the specific quad-tree partition structure.

Figure 3:
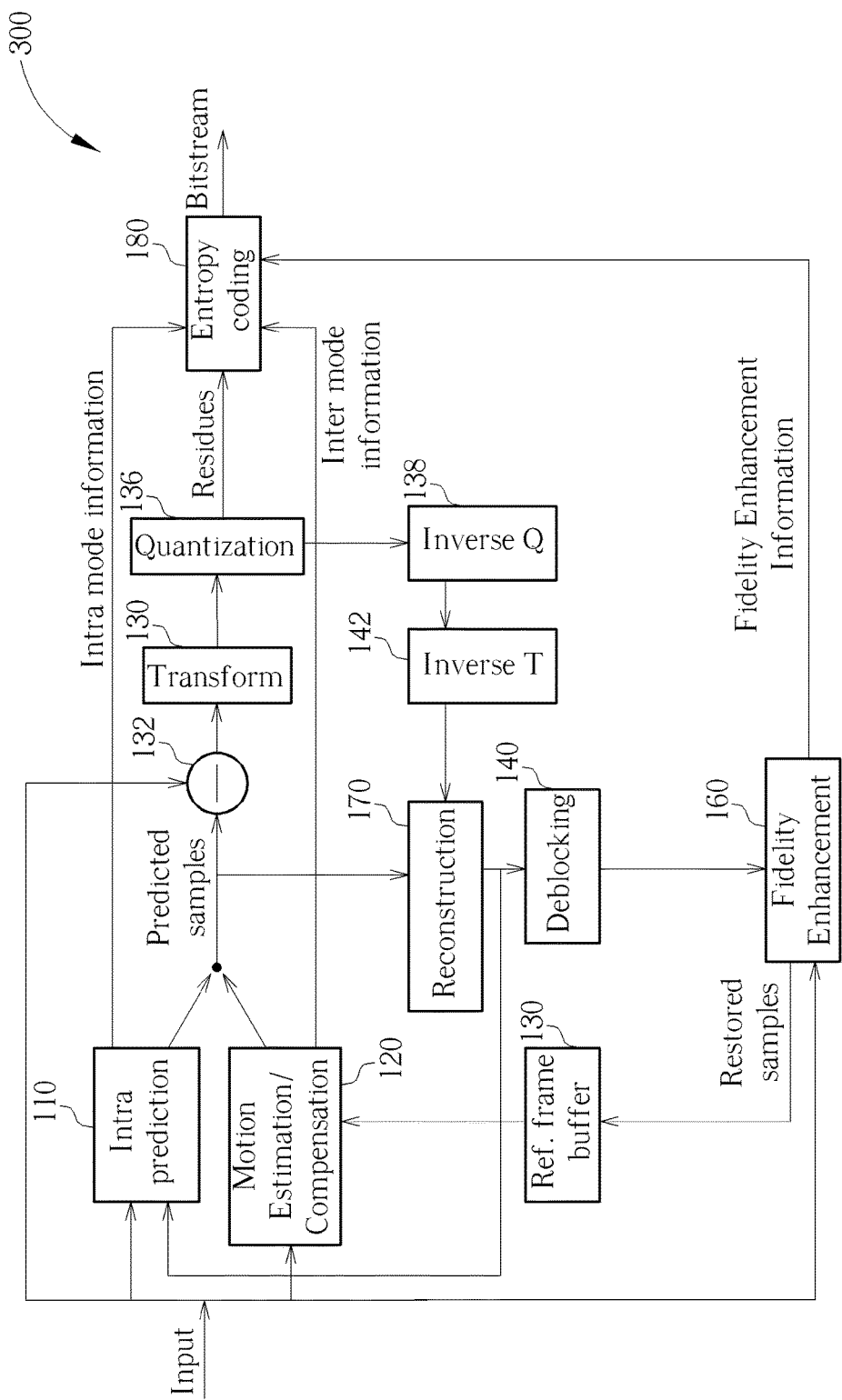
FIG. 3 is a diagram of an encoder according to a second embodiment of the present invention.
Figure 4:
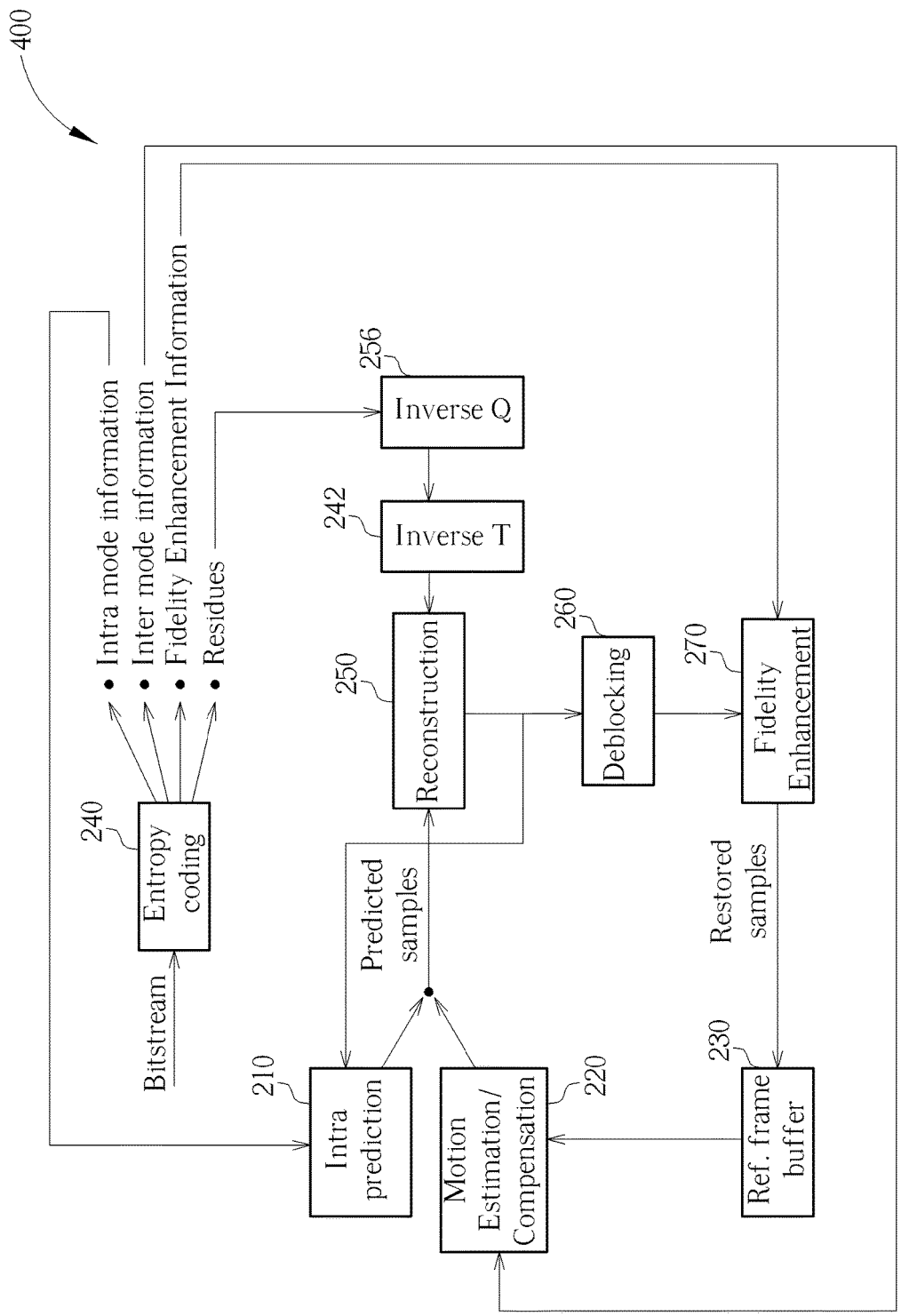
FIG. 4 is a diagram of a decoder according to the second embodiment of the present invention.

Please refer to FIG. 3 and FIG. 4. FIG. 3 and FIG. 4 are, respectively, diagrams of an encoder 300 and decoder 400 according to a second embodiment of the present invention. The encoder 300 and decoder 400 each include an FE block 160, 270. The FE block 160 of the encoder 300 located after the deblocking unit 140 is utilized to reduce errors between processed data of a current frame and original data (i.e. unprocessed data) of the current frame, and generate compensated processed data. The compensated processed data from the FE block 160 is stored in the reference frame buffer 130. It should be noted that the operation and function of each block shown in FIGS. 3 and 4 are the same as the respective blocks shown in FIGS. 1 and 2, and therefore all numerals have been kept the same.

Figure 5:
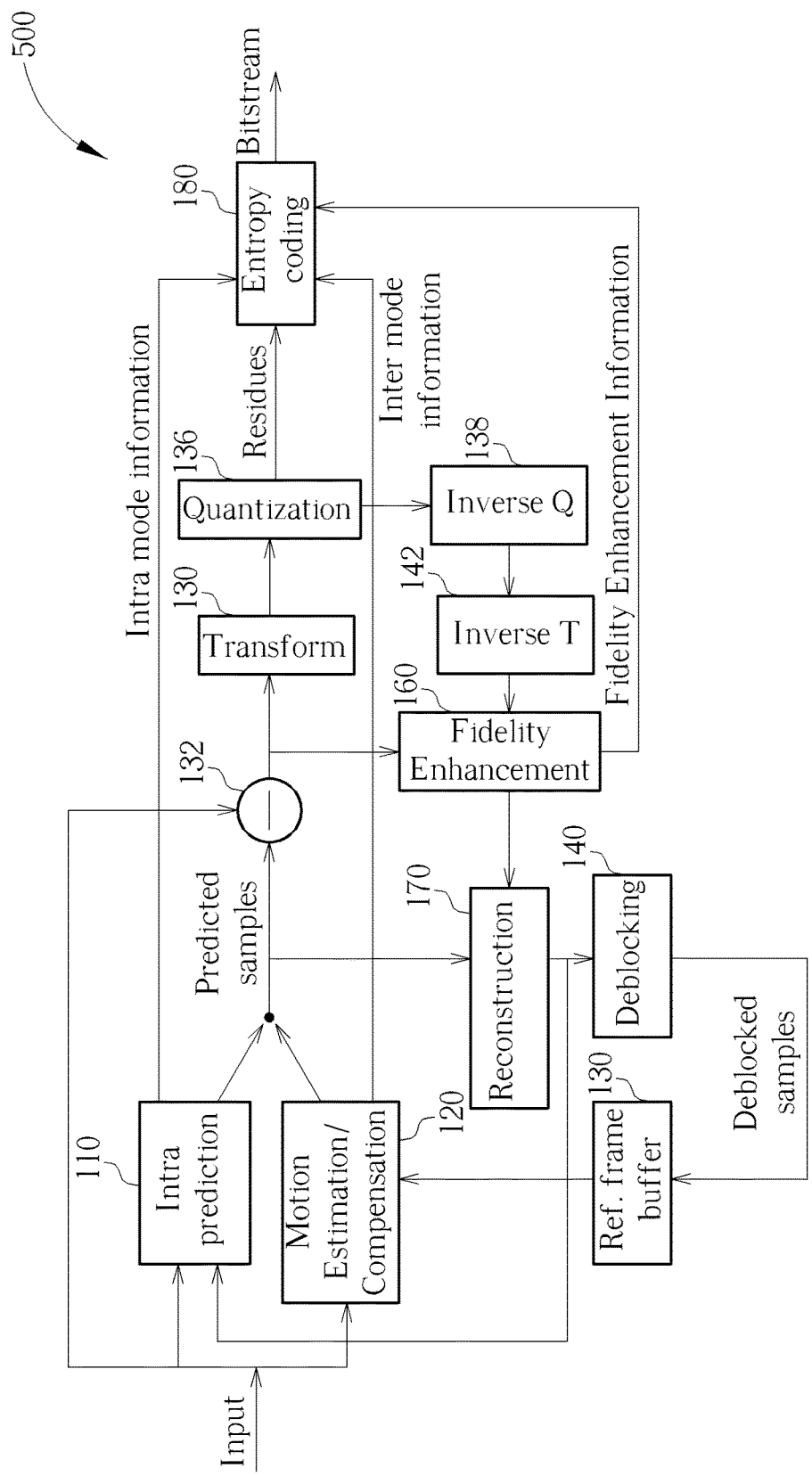
FIG. 5 is a diagram of an encoder according to a third embodiment of the present invention.
Figure 6:
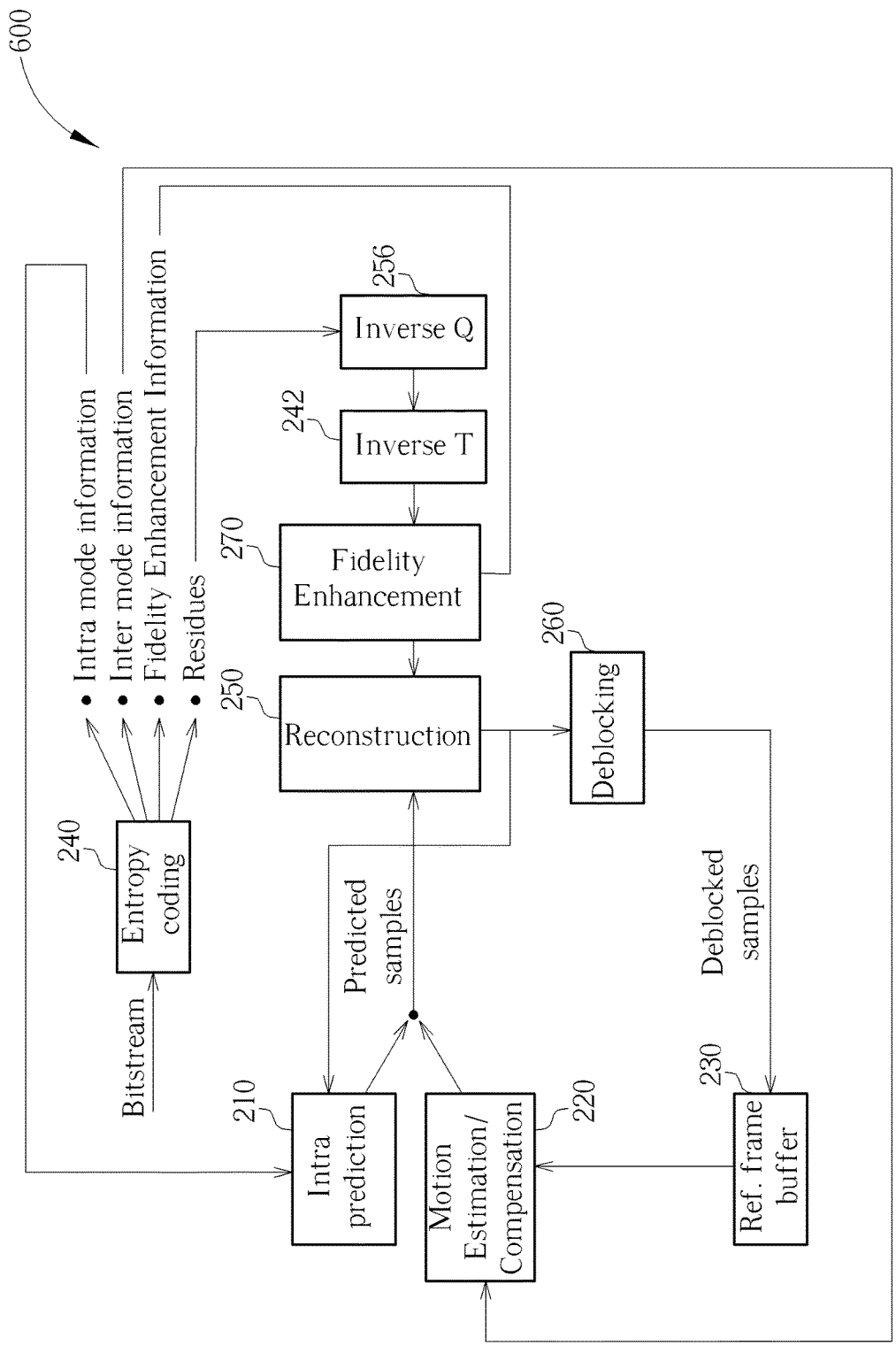
FIG. 6 is a diagram of a decoder according to the third embodiment of the present invention.
Figure 7:
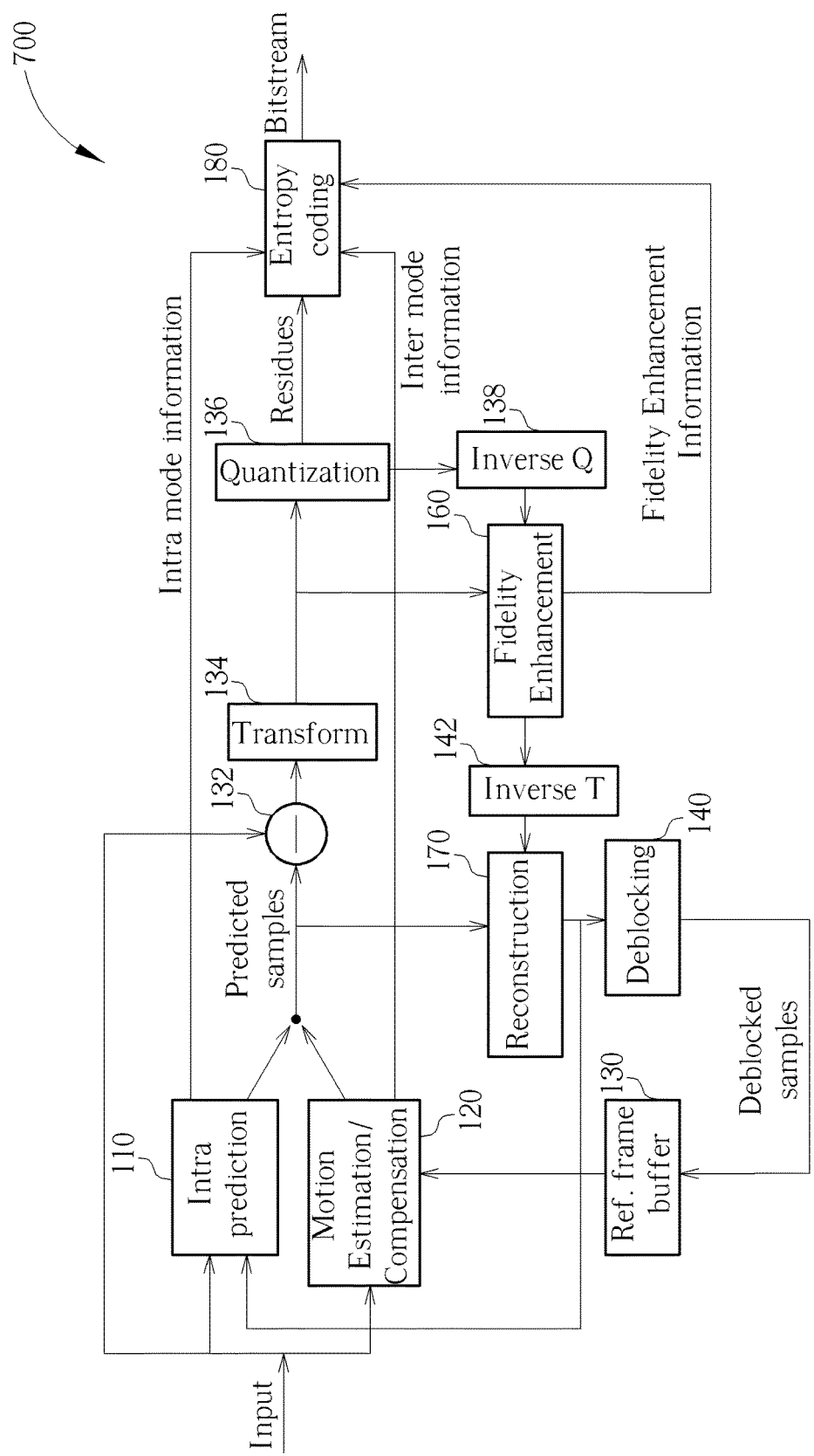
FIG. 7 is a diagram of an encoder according to a fourth embodiment of the present invention.
Figure 8:
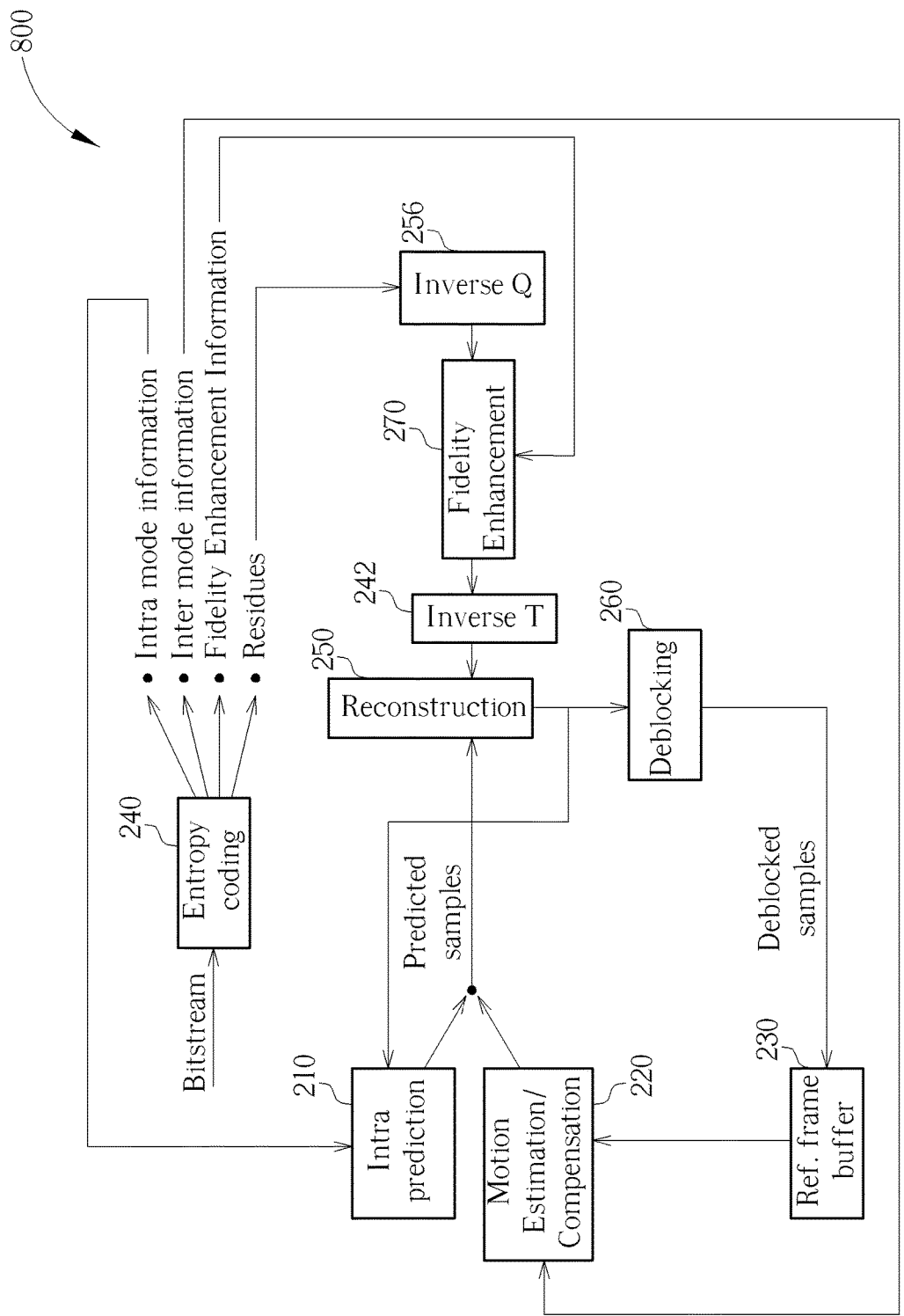
FIG. 8 is a diagram of a decoder according to the fourth embodiment of the present invention.

Please refer to FIGS. 5~8. FIGS. 5~8 are diagrams of, respectively, an encoder 500 according to a third embodiment of the present invention, a decoder 600 according to the third embodiment of the present invention, an encoder 700 according to a fourth embodiment of the present invention, and a decoder 800 according to the fourth embodiment of the present invention. The difference between each embodiment is the location of the FE block. The FE block in each diagram is capable of performing fidelity enhancement techniques including Wiener filtering. In some embodiments, quad-tree partition is employed, and the reuse method can further reduce the calculation time. For example, when Wiener filtering is performed on a smaller area and then performed on a larger area including the smaller area, already generated cross and auto-correlation matrices can be re-used for the filtering. Furthermore, each disclosed encoder is capable of utilizing an adaptive pointer in the header of the encoded bitstream for indicating the location of the fidelity enhancement information in the bitstream. In the third embodiment, as shown in FIG. 5, the FE block 160 performs fidelity enhancement on processed data of a current frame to reduce errors introduced by the transform block 134, quantization block 136, inverse quantization block 138, and inverse transform block 142 processes. In the fourth embodiments as shown in FIG. 7, the FE block 160 performs fidelity enhancement on processed data of a current frame to reduce errors introduced by the quantization block 136 and inverse quantization block 138 processes.

It should be obvious to those skilled in the art that the disclosed FE block is not limited to the single location disclosed in the above diagrams, and that an encoder and decoder comprising a plurality of FE blocks in a plurality of locations is also within the scope of the present invention. It is also possible for each FE block in the encoder and decoder to perform different fidelity enhancement methods. It should further be appreciated that it is not necessary for the FE blocks to perform all the above-disclosed methods (pointer in bitstream indicating location of FE information, quad-tree partition, re-use of calculation result in quad-tree partition, etc.) and an FE block that only performs some or one of the above-disclosed fidelity enhancement techniques also falls within the scope of the present invention.

The present invention expands on the idea of utilizing Wiener filtering at the encoding side and embedding pertinent filtering information into the encoded bitstream by providing a plurality of fidelity enhancement techniques at the encoder side, wherein pertinent information will similarly be embedded in the encoded bitstream. The present invention also provides a method for performing fidelity enhancement such as Wiener filtering on a frame divided according to quad-tree partition, as well as re-use of calculation results. Finally, the present invention provides means for a decoder to instantly access the FE information even when it is not embedded in the header of the bitstream, by providing a pointer in the header of the bitstream for indicating location of the FE information.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A decoder for receiving a bitstream to generate video frames, comprising:
    an entropy decoding unit, for decoding the bitstream to generate residues, inter mode information, intra mode information and discrepancy modeling information;
    an intra prediction block, for performing intra prediction according to the intra mode information of each intra-coded region of a current video frame and processed data of reference regions of the current video frame to generate predictors;
    a motion compensation block, for performing motion compensation according to the inter mode information of each inter-coded region of the current video frame and a corresponding region of another video frame to generate predictors; and
    a reconstruction loop, coupled to the entropy decoding unit, the intra prediction block, and the motion compensation block, wherein the reconstruction loop comprises:
        a reconstruction block, for reconstructing the current video frame from the residues and the predictors to generate a reconstructed video frame; and
        a discrepancy modeling block, coupled to the reconstruction block and the motion compensation block, for receiving the discrepancy modeling information from the entropy decoding unit, and applying a discrepancy modeling technique on processed data corresponding to the intra-coded regions and inter-coded regions of the current video frame according to the discrepancy modeling information;
    wherein the discrepancy modeling technique is performed for a region of the current video frame to reduce quantization errors between the processed data and original data of the region of the current video frame, and the output of the discrepancy modeling block is used by the motion compensation block to generate the predictors.

2. The decoder of claim 1, wherein the discrepancy modeling technique comprises DC offset compensation, weighted prediction, or spatial prediction.

3. The decoder of claim 1, wherein the reconstruction loop further comprises a reference frame buffer, and the discrepancy modeling block receives the processed data of the current video frame, performs the discrepancy modeling technique according to the discrepancy modeling information to generate compensated processed data, and stores the compensated processed data in the reference frame buffer, wherein the motion compensation block receives the compensated processed data from the reference frame buffer.

4. The decoder of claim 1, wherein the reconstruction loop further comprises a deblocking unit for performing deblocking to the reconstructed video frame output from the reconstruction block, and the deblocking unit generates the processed data for the discrepancy modeling block.

5. An encoder for receiving original data of video frames and performing encoding processes to generate an encoded bitstream, the encoder comprising:
    a motion estimation and motion compensation block, for performing prediction on a region of a current video frame according to the original data of the region and a reference region of another video frame to generate prediction residues and inter prediction information;
    an intra prediction block, for performing intra prediction on a region of the current video frame according to the original data of the region and processed data of reference regions of the current video frame to generate prediction residues and intra prediction information;
    a transform and quantization block, coupled to the prediction blocks, for performing transform and quantization processes on the prediction residues;
    a reconstruction loop, coupled between the transform and quantization block, the intra prediction block, and the motion estimation and motion compensation block;
    wherein the reconstruction loop comprises:

a reconstruction block, for reconstructing the video frame according to information from the transform and quantization block to generate reconstructed video frame; and a discrepancy modeling block, coupled to the reconstruction block and the motion estimation and motion compensation block, for performing a discrepancy modeling technique on processed data corresponding to each region of the current video frame according to the original data of each region and corresponding processed data of the region, and generating discrepancy modeling information; and an entropy coding block, for encoding the prediction residues with the discrepancy modeling information, the inter prediction information and the intra prediction information into the encoded bitstream;

wherein the discrepancy modeling technique is performed to reduce quantization errors between the processed data and original data of the current video frame, and the output of the discrepancy modeling block is used by the motion estimation and motion compensation block to generate the prediction residues.

6. The encoder of claim 5, wherein the discrepancy modeling technique comprises DC offset compensation, weighted prediction, or spatial prediction.

7. The encoder of claim 5, wherein the reconstruction loop further comprises a reference frame buffer, and the discrepancy modeling block receives the processed data of the current video frame, performs the discrepancy modeling technique according to the discrepancy modeling information to generate compensated processed data, and stores the compensated processed data in the reference frame buffer, wherein the motion estimation and motion compensation block receives the compensated processed data from the reference frame buffer.

8. The encoder of claim 5, wherein the reconstruction loop further comprises a deblocking unit for performing deblocking to the reconstructed video frame output from the reconstruction block, and the deblocking unit generates the processed data for the discrepancy modeling block.

\* \* \* \* \*